United States Patent
Aimone et al.

(10) Patent No.: US 11,993,832 B2
(45) Date of Patent: *May 28, 2024

(54) NIOBIUM-BASED ALLOY THAT IS RESISTANT TO AQUEOUS CORRISON

(71) Applicants: Paul Aimone, Bridgewater, MA (US); Mei Yang, Shrewsbury, MA (US)

(72) Inventors: Paul Aimone, Bridgewater, MA (US); Mei Yang, Shrewsbury, MA (US)

(73) Assignee: MATERION NEWTON INC., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,479

(22) Filed: Mar. 20, 2023

(65) Prior Publication Data

US 2023/0227950 A1 Jul. 20, 2023

Related U.S. Application Data

(60) Continuation of application No. 16/519,063, filed on Jul. 23, 2019, now Pat. No. 11,629,393, which is a continuation of application No. 15/801,717, filed on Nov. 2, 2017, now Pat. No. 10,382,886, which is a continuation of application No. 15/429,691, filed on Feb. 10, 2017, now Pat. No. 9,834,829, which is a continuation-in-part of application No. 14/834,493, filed on Aug. 25, 2015, now Pat. No. 9,580,773, which is a continuation of application No. 12/915,781, filed on Oct. 29, 2010, now Pat. No. 9,187,802, which is a division of application No. 12/498,770, filed on Jul. 7, 2009, now abandoned.

(51) Int. Cl.
| | | |
|---|---|---|
| C22C 27/02 | (2006.01) | |
| B23K 26/342 | (2014.01) | |
| B33Y 70/00 | (2020.01) | |
| B33Y 80/00 | (2015.01) | |
| C22B 9/22 | (2006.01) | |
| C22B 34/24 | (2006.01) | |
| C22C 1/02 | (2006.01) | |
| C22C 1/04 | (2023.01) | |
| C22F 1/18 | (2006.01) | |
| F28F 19/06 | (2006.01) | |
| B33Y 10/00 | (2015.01) | |

(52) U.S. Cl.
CPC ............ *C22C 27/02* (2013.01); *B23K 26/342* (2015.10); *B33Y 70/00* (2014.12); *B33Y 80/00* (2014.12); *C22B 9/226* (2013.01); *C22B 9/228* (2013.01); *C22B 34/24* (2013.01); *C22C 1/02* (2013.01); *C22C 1/045* (2013.01); *C22F 1/18* (2013.01); *F28F 19/06* (2013.01); *B33Y 10/00* (2014.12)

(58) Field of Classification Search
CPC .................................. C22C 27/02; C22F 1/18
See application file for complete search history.

(56) References Cited

U.S. PATENT DOCUMENTS

| | | |
|---|---|---|
| 1,167,827 A | 1/1916 | Kaiser |
| 3,109,734 A | 11/1963 | Bishop et al. |
| 3,395,012 A | 7/1968 | McAdam et al. |
| 3,592,639 A | 7/1971 | Schussler et al. |
| 3,775,096 A | 11/1973 | Guidotti et al. |
| 4,062,679 A | 12/1977 | Marsh et al. |
| 4,784,830 A | 11/1988 | Ganesan et al. |
| 4,889,182 A | 12/1989 | Kosters |
| 6,800,392 B2 | 10/2004 | Jantsch et al. |
| 9,187,802 B2 | 11/2015 | Aimone et al. |
| 9,580,773 B2 | 2/2017 | Aimone et al. |
| 9,834,829 B1 | 12/2017 | Aimone et al. |
| 10,400,314 B2 | 9/2019 | Aimone et al. |
| 2002/0072475 A1 | 6/2002 | Michaluk et al. |
| 2003/0205106 A1 | 11/2003 | Omori et al. |
| 2005/0142021 A1 | 6/2005 | Aimone et al. |
| 2006/0153729 A1 | 7/2006 | Stinson et al. |
| 2011/0008201 A1 | 1/2011 | Aimone et al. |
| 2014/0165686 A1 | 6/2014 | Ukolowicz et al. |
| 2015/0368754 A1 | 12/2015 | Aimone et al. |
| 2018/0127854 A1 | 5/2018 | Aimone et al. |

*Primary Examiner* — Jessee R Roe
(74) *Attorney, Agent, or Firm* — Morgan, Lewis & Bockius LLP

(57) ABSTRACT

In various embodiments, a metal alloy resistant to aqueous corrosion consists essentially of or consists of niobium with additions of tungsten, molybdenum, and one or both of ruthenium and palladium.

19 Claims, 3 Drawing Sheets

NIOBIUM-BASED ALLOY THAT IS RESISTANT TO AQUEOUS CORRISON

RELATED APPLICATIONS

Figure 1:
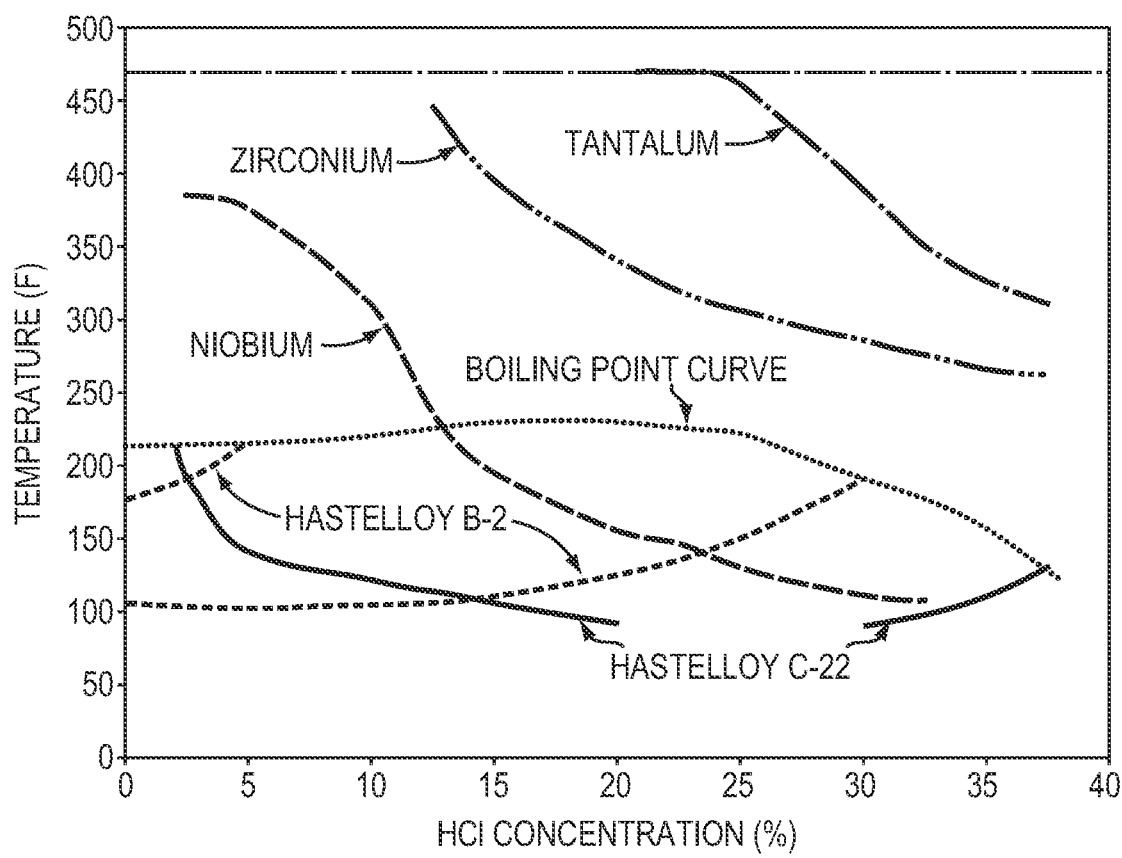

This application is a continuation of U.S. patent application Ser. No. 16/519,063, filed Jul. 23, 2019, now issued as U.S. Pat. No. 11,629,393, which is a continuation of U.S. patent application Ser. No. 15/801,707, filed Nov. 2, 2017, now issued as U.S. Pat. No. 10,400,314, which is a continuation of U.S. patent application Ser. No. 15/429,691, filed Feb. 10, 2017, now issued as U.S. Pat. No. 9,834,829, which is a continuation-in-part of U.S. patent application Ser. No. 14/834,493, filed Aug. 25, 2015, now issued as U.S. Pat. No. 9,580,773, which is a continuation of U.S. patent application Ser. No. 12/915,781, filed Oct. 29, 2010, now issued as U.S. Pat. No. 9,187,802, which is a division of U.S. patent application Ser. No. 12/498,770, filed Jul. 7, 2009, now abandoned, the entire disclosure of each of which is hereby incorporated herein by reference.

TECHNICAL FIELD

In various embodiments, the present invention relates to niobium or niobium-based alloys that are resistant to aqueous corrosion, more particularly to corrosion from acids and resistant to hydrogen embrittlement. The niobium or niobium-based alloy has superior resistance to hydrogen absorption (and subsequent hydrogen embrittlement) as compared to pure niobium.

Pure niobium begins to become significantly hydrogen embrittled at hydrogen concentrations greater than 100 ppm. In the chemical-processing industry (CPI), pure niobium will absorb hydrogen and become embrittled when exposed to hot HCl and hot $H_2SO_4$ at conditions illustrated in FIGS. 1 and 2. Where niobium and niobium alloys are used in the CPI to contain hot and concentrated acids, hydrogen embrittlement, rather than a loss of wall thickness due to corrosion, is the predominant failure mechanism.

U.S. Pat. No. 4,784,830 discloses that oxidation resistance of alloys can be improved by a controlled addition and retention of nitrogen. Put another way, it has been discovered that the microstructure of the alloys of the type under consideration, notably grain size, can be controlled or rendered relatively structurally stable over extended 30 periods at elevated temperature through a micro alloying addition of nitrogen. In addition, and most advantageously, a special ratio of silicon to titanium should be observed in seeking extended service life.

U.S. Pat. No. 3,592,639 relates to a ternary Ta—W alloy which contains from 1.5 to 3.5 percent of tungsten Niobium can also be present in the alloy from 0.05 to 0.5 weight percent. Molybdenum is limited to 0.5% maximum (less than 5000 ppm) to promote smaller grain size in the alloy.

U.S. Pat. No. 4,062,679 claims a wrought tantalum product of, substantially pure tantalum containing less than 300 parts per million of columbium, less than 200 parts per million of iron, chromium and nickel combined, less than 50 parts per million of tungsten, less than 10 parts per million of molybdenum, less than 30 parts per million of chromium, and less than 20 parts per million of calcium, the improvement which comprises the inclusion of from about 50 to about 700 parts per million of silicon in the composition of said product whereby said product is improved in resistance to embrittlement when exposed to elevated temperatures in an oxygen-containing environment.

SUMMARY in accordance with various embodiments, the invention relates to a process of improving corrosion and hydrogen embrittlement resistance by micro alloying at least one metal element selected from the group consisting of Ru, Rh, Pd, Os, Ir, Pt, Mo, W, and Re with a pure or substantially pure niobium or a niobium alloy.

One preferred embodiment of this invention adds platinum to niobium. The chemical process industry is seeking new niobium alloys that will permit greater operating temperatures in their process equipment.

An object of the invention is to have an improved niobium alloy which is more resistant to aqueous corrosion and hydrogen embrittlement.

Various embodiments of the invention include a niobium alloy that comprises pure or substantially pure niobium or a niobium alloy and at least one metal element selected from the group consisting of Ru, Rh, Pd, Os, Ir, Pt, Mo, W, and Re to form a niobium alloy that is resistant to aqueous corrosion.

The metal element(s) may be in an amount up to the solubility limit of metal in the niobium.

In an aspect, embodiments of the invention feature a metallic alloy that includes, consists essentially of, or consists of approximately 1 weight percent approximately 5 weight percent tungsten, approximately 0.5 weight percent-approximately 5 weight percent molybdenum, ruthenium and/or palladium collectively present at approximately 0.2 weight percent-approximately 5 weight percent, and the balance niobium (e.g., pure or substantially pure niobium). The grain size (e.g., average grain size or maximum grain size) of the alloy is no less than approximately 6 microns. The grain size of the alloy may be less than 25 microns, less than 20 microns, less than 15 microns, or less than 10 microns.

Embodiments of the invention may include one or more of the following in any of a variety of combinations. The tungsten may be present at approximately 2 weight percent-approximately 3 weight percent. The molybdenum may be present at approximately 1 weight percent-approximately 2 weight percent. The ruthenium and/or palladium may be collectively present at approximately 0.2 weight percent-approximately 2 weight percent, approximately 0.2 weight percent approximately 1 weight percent, approximately 0.2 weight percent approximately 0.8 weight percent, or approximately 0.2 weight percent approximately 0.5 weight percent. The alloy may include both ruthenium and palladium. The ratio of ruthenium content to palladium content in the alloy may range from approximately 1000:1 to approximately 1:1000, from approximately 500:1 to approximately 1:500, or from approximately 100:1 to approximately 1:100. The alloy may include, consist essentially of, or consist of approximately 3 weight percent tungsten, approximately 1.5 weight percent molybdenum, ruthenium present at 0.2 weight percent 1 weight percent, and the balance niobium (e g, pure or substantially pure niobium) The alloy may include, consist essentially of, or consist of approximately 3 weight percent tungsten, approximately 1.5 weight percent molybdenum, palladium present at 0.2 weight percent 1 weight percent, and the balance niobium (e.g., pure or substantially pure niobium).

In another aspect, embodiments of the invention feature a method of producing a niobium alloy. The method includes, consists essentially of, or consists of micro alloying or alloying niobium (e.g., pure or substantially pure niobium) with (1) tungsten, (2) molybdenum, and (3) ruthenium and/or palladium. The micro alloying or alloying is performed to produce the niobium alloy via laser additive manufacturing (LAM), vacuum arc remelting (VAR), electron beam melting (EBM), or plasma arc melting (PAM) The tungsten is present at approximately 1 weight percent-approximately 5 weight percent in the niobium alloy. The molybdenum is present at approximately 0.5 weight percent-approximately 5 weight percent in the niobium alloy. The ruthenium and/or palladium are collectively present at approximately 0.2 weight percent-approximately 5 weight percent in the niobium alloy.

Embodiments of the invention may include one or more of the following in any of a variety of combinations. The micro alloying or alloying may be performed via laser additive manufacturing (LAM) The micro alloying or alloying may be performed via vacuum arc remelting (VAR). The micro alloying or alloying may be performed via electron beam melting (EBM). The micro alloying or alloying may be performed via plasma arc melting (PAM). The grain size (e.g., average grain size or maximum grain size) of the alloy may be no less than approximately 6 microns. The grain size of the alloy may be less than 25 microns, less than 20 microns, less than 15 microns, or less than 10 microns.

In yet another aspect, embodiments of the invention feature a method of exchanging heat with an acidic process fluid A heat exchanger is provided. The heat exchanger includes, consists essentially of, or consists of (i) a shell defining an interior volume therewithin, (ii) a plurality of tubes disposed within the interior volume, (iii) a process inlet fluidly connected to the plurality of tubes, (iv) a process outlet fluidly connected to the plurality of tubes, (v) an exchange inlet fluidly connected to the interior volume, and (vi) an exchange outlet fluidly connected to the interior volume. A heat-exchange fluid is flowed from the exchange inlet to the exchange outlet. The heat-exchange fluid makes thermal contact with an exterior of each of the tubes. A process fluid is flowed from the process inlet, through the plurality of tubes, to the process outlet. The flowing process fluid exchanges heat with the heat-exchange fluid (i.e., through the thickness of each of the tubes, without physical contact between the heat-exchange fluid and the process fluid). An interior of (or an entire thickness of) each of the tubes includes, consists essentially of, or consists of a metallic alloy. The metallic alloy includes, consists essentially of, or consists of (i) approximately 1 weight percent approximately 5 weight percent tungsten, (ii) approximately 0.5 weight percent approximately 5 weight percent molybdenum, (iii) ruthenium and/or palladium collectively present at approximately 0.2 weight percent-approximately 5 weight percent, and (iv) the balance niobium (e.g., pure or substantially pure niobium). The process fluid includes, consists essentially of, or consists of one or more acids. The interior of each of the tubes may resist corrosion by the process fluid during heat exchange between the process fluid and the heat-exchange fluid (i.e., the process fluid may corrode the interiors of the tubes by an amount (if at all) insufficient to compromise the physical integrity of the tubes and thus insufficient to result in direct contact between the process fluid and the heat-exchange fluid).

Embodiments of the invention may include one or more of the following in any of a variety of combinations. The process fluid may include, consist essentially of, or consist of hydrochloric acid, nitric acid, phosphoric acid, sulfuric acid, and/or acetic acid. Before exchanging heat with the heat-exchange fluid, a temperature of the process fluid may be in the range of approximately 80° C. to approximately 250° C. The heat-exchange fluid may include, consist essentially of, or consist of water and/or steam. The shell of the heat exchanger may include, consist essentially of, or consist of steel (e.g., stainless steel) Each of the tubes may include, consist essentially of, or consist of steel and a layer of the metallic alloy disposed on an interior surface thereof. The grain size (e.g., average grain size or maximum grain size) of the alloy may be no less than approximately 6 microns. The grain size of the alloy may be less than 25 microns, less than 20 microns, less than 15 microns, or less than 10 microns.

In another aspect, embodiments of the invention feature a heat exchanger for use with acidic process fluid. The heat exchanger includes, consists essentially of, or consists of a shell, a plurality of tubes, a process inlet, a process outlet, an exchange inlet, and an exchange outlet. The shell defines therewithin an interior volume for containing a heat-exchange fluid. The plurality of tubes is disposed within the interior volume. The plurality of tubes contains the process fluid during heat exchange between the process fluid and the heat-exchange fluid. The process inlet and the process outlet are each fluidly connected to the plurality of tubes. The process inlet supplies the process fluid to the plurality of tubes. The process outlet receives the process fluid from the plurality of tubes. The exchange inlet and the exchange outlet are fluidly connected to the interior volume. The exchange inlet supplies the heat-exchange fluid to the interior volume. The exchange outlet receives the heat-exchange fluid from the interior volume. The interior of each of the tubes is not fluidly connected to the interior volume. An interior of (or an entire thickness of) each of the tubes includes, consists essentially of, or consists of a metallic alloy. The metallic alloy includes, consists essentially of, or consists of (i) approximately 1 weight percent approximately 5 weight percent tungsten, (ii) approximately 0.5 weight percent approximately 5 weight percent molybdenum, (iii) ruthenium and/or palladium collectively present at approximately 0.2 weight percent approximately 5 weight percent, and (iv) the balance niobium (e.g., pure or substantially pure niobium).

Embodiments of the invention may include one or more of the following in any of a variety of combinations. The grain size (e.g., average grain size or maximum grain size) of the alloy may be no less than approximately 6 microns. The grain size of the alloy may be less than 25 microns, less than 20 microns, less than 15 microns, or less than 10 microns Each of the tubes may include, consist essentially of, or consist of steel and a layer of the metallic alloy disposed on an interior surface thereof.

In an aspect, embodiments of the invention feature a metallic alloy resistant to aqueous corrosion. The alloy includes, consists essentially of, or consists of approximately 1 weight percent-approximately 10 weight percent tungsten, approximately 1 weight percent-approximately 10 weight percent molybdenum, ruthenium and/or palladium collectively present at approximately 0.2 weight percent-approximately 5 weight percent, and the balance niobium (e.g., pure or substantially pure niobium).

Embodiments of the invention may include one or more of the following in any of a variety of combinations. The tungsten may be present at approximately 2 weight percent-approximately 10 weight percent. The molybdenum may be present at approximately 2 weight percent-approximately 10 weight percent. The ruthenium and/or palladium may be collectively present at approximately 0.5 weight percent-approximately 5 weight percent, approximately 0.5 weight percent approximately 1 weight percent, or approximately 0.5 weight percent approximately 0.8 weight percent. The alloy may include both ruthenium and palladium. The ratio of ruthenium content to palladium content in the alloy may range from approximately 1000:1 to approximately 1:1000, from approximately 500:1 to approximately 1:500, or from approximately 100:1 to approximately 1:100. The tungsten may be present at approximately 2 weight percent-approximately 10 weight percent. The molybdenum may be present at approximately 2 weight percent-approximately 10 weight percent. The ruthenium and/or palladium may be collectively present at approximately 2 weight percent approximately 5 weight percent in another aspect, embodiments of the invention feature a method of producing a niobium alloy that is resistant to aqueous corrosion. The method includes, consists essentially of, or consists of micro alloying or alloying niobium (e.g., pure or substantially pure niobium) with tungsten, molybdenum, and ruthenium and/or palladium. The micro alloying or alloying is performed to produce the niobium alloy via laser additive manufacturing (LAM), vacuum arc remelting (VAR), electron beam melting (EBM), or plasma arc melting (PAM). The tungsten is present at approximately 1 weight percent approximately 10 weight percent in the niobium alloy. The molybdenum is present at approximately 1 weight percent approximately 10 weight percent in the niobium alloy. The ruthenium and/or palladium is collectively present at approximately 0.2 weight percent-approximately 5 weight percent in the niobium alloy.

Embodiments of the invention may include one or more of the following in any of a variety of combinations. The micro alloying or alloying may be performed via laser additive manufacturing (LAM). The micro alloying or alloying may be performed via vacuum arc remelting (VAR). The micro alloying or alloying may be performed via electron beam melting (EBM). The micro alloying or alloying may be performed via plasma arc melting (PAM).

In yet another aspect, embodiments of the invention feature a method of exchanging heat with an acidic process fluid. A heat exchanger is provided. The heat exchanger includes, consists essentially of, or consists of (i) a shell defining an interior volume therewithin, (ii) a plurality of tubes disposed within the interior volume, (iii) a process inlet fluidly connected to the plurality of tubes, (iv) a process outlet fluidly connected to the plurality of tubes, (v) an exchange inlet fluidly connected to the interior volume, and (vi) an exchange outlet fluidly connected to the interior volume. A heat-exchange fluid is flowed from the exchange inlet to the exchange outlet. The heat-exchange fluid makes thermal contact with an exterior of each of the tubes. A process fluid is flowed from the process inlet, through the plurality of tubes, to the process outlet. The flowing process fluid exchanges heat with the heat-exchange fluid (i.e., through the thickness of each of the tubes, without physical contact between the heat-exchange fluid and the process fluid). An interior of (or an entire thickness of) each of the tubes includes, consists essentially of, or consists of a metallic alloy. The metallic alloy includes, consists essentially of, or consists of (i) approximately 1 weight percent approximately 10 weight percent tungsten, (ii) approximately 1 weight percent approximately 10 weight percent molybdenum, (iii) ruthenium and/or palladium collectively present at approximately 0.2 weight percent-approximately 5 weight percent, and (iv) the balance niobium (e.g., pure or substantially pure niobium). The process fluid includes, consists essentially of, or consists of one or more acids. The interior of each of the tubes resists corrosion by the process fluid during heat exchange between the process fluid and the heat-exchange fluid.

Embodiments of the invention may include one or more of the following in any of a variety of combinations. The process fluid may include, consist essentially of, or consist of hydrochloric acid, nitric acid, phosphoric acid, sulfuric acid, and/or acetic acid. Before exchanging heat with the heat-exchange fluid, a temperature of the process fluid may be in the range of approximately 80° C. to approximately 250° C. The heat-exchange fluid may include, consist essentially of, or consist of water and/or steam. The shell of the heat exchanger may include, consist essentially of, or consist of steel (e.g., stainless steel) Each of the tubes may include, consist essentially of, or consist of steel and a layer of the metallic alloy disposed on an interior surface thereof.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "about," "approximately," and "substantially" mean ±10%, and in some embodiments, =5% The term "consists essentially of" means excluding other materials that contribute to function, unless otherwise defined herein. Nonetheless, such other materials may be present, collectively or individually, in trace amounts; thus, a material consisting essentially of one or more components may also include unintentional impurities. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen or nitrogen (e.g., metal nitrides or metal oxides); such non-metallic elements or chemical species may be present, collectively or individually, in trace amounts, e.g., as impurities.

Figure 2:
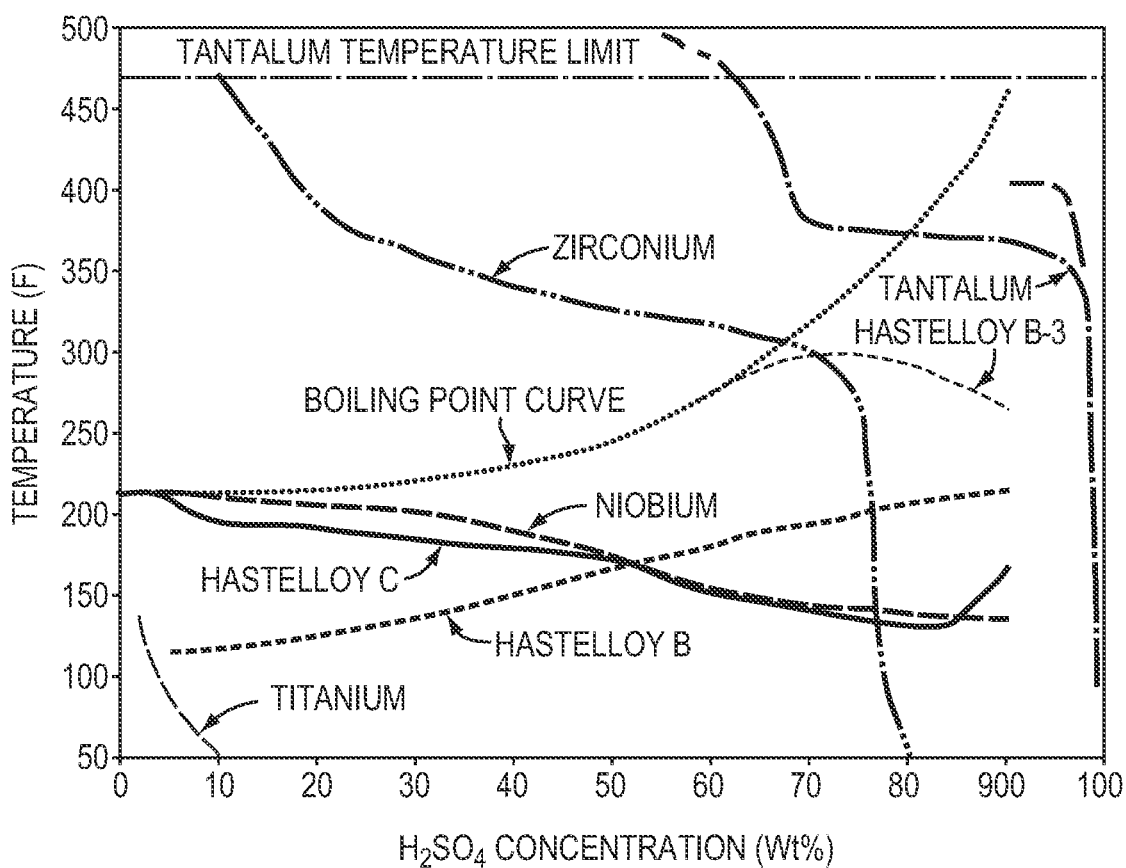
Figure 3:
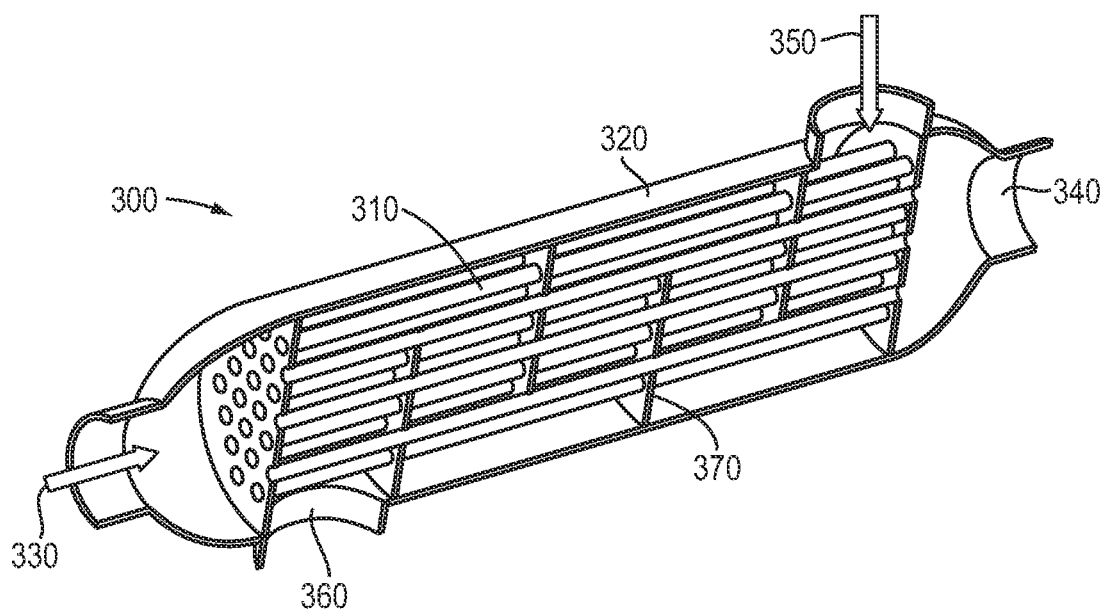

BRIEF DESCRIPTION OF THE DRAWINGS in the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1 illustrates the conditions for the chemical processing industry that pure niobium will absorb hydrogen and become embrittled when exposed to hot HCl, FIG. 2 illustrates the conditions for the chemical processing industry that pure niobium will absorb hydrogen and become embrittled when exposed to hot $H_2SO_4$; and FIG. 3 is a partial schematic of a heat exchanger in accordance with various embodiments of the invention.

DETAILED DESCRIPTION

As used herein, the singular terms "a" and "the" are synonymous and used interchangeably with "one or more." Accordingly, for example, reference to "a metal" herein or in the appended claims can refer to a single metal or more than one metal. Additionally, all numerical values, unless otherwise specifically noted, are understood to be modified by the word "about."

A niobium or niobium-based alloy that is resistant to aqueous corrosion, more particularly to corrosion from acids and resistant to hydrogen embrittlement. The starting niobium is pure or substantially pure. Substantially pure niobium would be a niobium alloy which has up to about 11% by weight of non-niobium components.

The niobium or niobium-based alloys may be prepared using a vacuum melting process. Vacuum arc remelting (VAR), electron beam melting (EBM) or plasma arc melting (PAM) are methods of vacuum melting that may also be used for alloying. To formulate the actual alloy, at least one element selected from the group consisting of ruthenium, rhodium, palladium, osmium, iridium, platinum, molybdenum, tungsten, and ruthenium (Ru, Rh, Pd, Os, Ir, Pt, Mo, W, and Re) are added to the pure niobium material or substantially pure niobium material or niobium alloy using one of the vacuum melting processes listed above. Although it is noted that VAR, EBM or PAM may all be used, one preferred technique is VAR.

Alternative embodiments of this invention include adding one or more elements other than (or in addition to) the elements listed above that improve the corrosion and hydrogen embrittlement resistance. These additional elements may include yttrium, gold, cerium, praseodymium, neodymium, and/or thorium.

Each of the metals may be present as 10 weight percent or less, 5 weight percent or less, less than 10,000 ppm of the alloy, less than 5,000 ppm of the total amount of the alloy, or even less 2,000 ppm of the total amount of alloy. The metal may be added in an amount of at least 50 ppm, at least 100 ppm, at least 150 ppm, at least 200 ppm, or even at least 250 ppm.

Various embodiments of the invention feature the addition of platinum, as platinum has the greatest number of free electrons to theoretically pull in additional oxygen atoms to close the holes in the $Nb_2O_5$ oxide layer and/or provide sites of low hydrogen overvoltage thereby stabilizing the $Nb_2O_5$ oxide layer.

Various embodiments use the addition of ruthenium, rhodium, palladium, osmium, and/or iridium (also known as "platinum group metals," PGM) which also would provide sites of low hydrogen overvoltage thereby stabilizing the $Nb_2O_5$ oxide layer.

Still another embodiment uses the addition of molybdenum since it has the same crystal structure, a similar lattice parameter, and complete solid solubility in both niobium and tungsten. This is shown in Table I and FIG. 1.

TABLE I

Crystal Structure and Lattice Parameters for Refractory Elements

| Element | Symbol | Crystal Structure | Lattice Parameter (Å) |
|---|---|---|---|
| Niobium | Nb | body centered cubic (bcc) | 3.301 |
| Tungsten | W | body centered cubic (bcc) | 3.16 |
| Molybdenum | Mo | body centered cubic (bcc) | 3.15 |
| Platinum | Pt | face centered cubic (fcc) | 3.931 |
| Rhenium | Re | hexagonal close packed (hcp) | a 2.761, c 4.458 |

Another embodiment uses the addition of rhenium since rhenium has the same crystal structure and a similar lattice parameter to niobium and tungsten Niobium ingots formulated using VAR or PAM may then be used to produce plate, sheet, and tube products in a manner similar to that used to manufacture these same products from pure niobium or niobium alloy.

The advantages of the new alloys are superior corrosion and hydrogen embrittlement resistance over pure niobium. Various embodiments feature the addition of platinum, since platinum has the greatest number of free electrons to theoretically pull in additional oxygen atoms and help close the holes in the $Nb_2O_5$ oxide layer and/or provide sites of low hydrogen overvoltage thereby stabilizing the $Nb_2O_5$ oxide layer.

As mentioned above, niobium alloys in accordance with embodiments of the present invention may be advantageously utilized to form equipment for the chemical-processing industry. Such equipment may include, for example, heat exchangers, lined vessels, static mixers, and pumps. FIG. 3 depicts an exemplary heat exchanger 300 in accordance with various embodiments of the invention. As shown, heat exchanger 300 features a set of tubes 310 disposed within a shell 320. The tubes 310 are fluidly connected to a process inlet 330 and a process outlet 340. The volume within the shell 320 surrounding the tubes 310 is fluidly connected to an exchange inlet 350 and an exchange outlet 360. During operation, a process fluid flows through the process inlet 330, through the tubes 310, and out the process outlet 340. The process fluid may include, consist essentially of, or consist of an acidic fluid. For example, the process fluid may include, consist essentially of, or consist of one or more of hydrochloric acid, nitric acid, phosphoric acid, sulfuric acid, or acetic acid, or other acids or combinations of acids used in equipment for the chemical processing industry. The process fluid may be at approximately room temperature, or it may be heated (to, e.g., approximately 80° C. to approximately 250° C., or even to approximately the boiling point of one or more components of the fluid). In other embodiments, the process fluid may include, consist essentially of, or consist of one or more aqueous or molten salts.

In order to resist or substantially prevent aqueous corrosion by the process fluid, one or more portions of the heat exchanger 300 may include, consist essentially of, or consist of a niobium alloy in accordance with embodiments of the present invention. The shell 320, exchange inlet 350, and exchange outlet 360 (or, in various embodiments, portions of these components not contacting the process fluid during operation) may include, consist essentially of, or consist of a different material (e.g., steel such as stainless steel) However, the process inlet 330, tubes 310, and process outlet 340 may include, consist essentially of, or consist of a niobium alloy in accordance with embodiments of the present invention in order to resist corrosion by the process fluid. In various embodiments, the entireties of one or more of the process inlet 330, tubes 310, and process outlet 340 include, consist essentially of, or consist of the niobium alloy, while in other embodiments, one or more of these components includes, consists essentially of, or consists of a different material (that may not adequately resist corrosion by the process fluid, e.g., steel such as stainless steel) lined (e.g., at least on the inner surface facing the process fluid) with a layer of the niobium alloy.

During operation, a heat-exchange fluid flows into the exchange inlet 350, through the shell 320 and around the outer surfaces of the tubes 310, and out the exchange outlet 360. The heat-exchange fluid is typically at a temperature different from that of the process fluid, and thus the heat-exchange fluid exchanges heat with the process fluid through the thicknesses of the tubes 310. Thus, the process fluid is either heated or cooled, depending upon the relative temperatures of the process fluid and the heat-exchange fluid. The heat-exchange fluid may include, consist essentially of, or consist of, for example, air, water, steam, and/or any other fluid not corrosive to the shell 320 (or portions thereof not including, consisting essentially of, or consisting of the niobium alloy). In order to promote heat exchange along substantially the entire length of each of the tubes, one or more baffles 370 may be present within the shell 320. The baffles 370 may direct flow of the heat-exchange fluid in a non-straight-line (e.g., sinuous) path between the exchange inlet 350 and the exchange outlet 360 so that the heat-exchange fluid contacts all portions of each tube 310 substantially evenly. (Without the baffles 370, the heat-exchange fluid may flow directly from the exchange inlet 350 to the exchange outlet 360, and one or more portions of the tubes 310 (and the process fluid therein) may not exchange heat with the heat-exchange fluid efficiently.)

In various embodiments of the invention, rather than the process fluid flowing through the tubes 310 and exchanging heat with a heat-exchange fluid flowing through shell 320 and around the tubes 310, the heat-exchange fluid flows through the tubes 310 and the process fluid flows through the shell 320 and around the outer surfaces of the tubes 310. In such embodiments, the portions of the shell 320 and at least the outer surfaces of the tubes 310 may include, consist essentially of, or consist of a niobium alloy in accordance with embodiments of the invention in order to resist corrosion due to the process fluid. The outer surfaces of the tubes 310 and the inner surfaces of the shell 310 (and the outer surfaces of the baffles 370, if present) may be lined with a layer of the niobium alloy, or the entireties of these components may include, consist essentially of, or consist of the niobium alloy.

As detailed above, niobium alloys in accordance with embodiments of the present invention may feature niobium or substantially pure niobium with one or more metal elements present at concentrations up to their solubility limit in the niobium. Various embodiments of the invention feature multiple different metal elements added to the niobium matrix. Such embodiments may advantageously have superior mechanical strength and/or other advantageous properties in addition to resistance to aqueous corrosion. As detailed above, the various alloying elements may be alloyed with the niobium by methods such as LAM, VAR, EBM, or PAM. The elements may be alloyed with the niobium individually (i.e., as serial additions), or more than one (or even all) of the elements may be alloyed with the niobium together at the same time. Once alloyed, the metallic alloys in accordance with embodiments of the invention may subsequently be mechanically worked (e.g., by rolling, forging, extrusion, etc.) and annealed to, for example, recrystallize the grain structure of the alloy. Alloys in accordance with embodiments of the invention may be annealed at temperatures of, for example, 1900° F.-2300° F., and may be recrystallized at levels of, e.g., approximately 95% to approximately 100%. The resulting grain size of alloys in accordance with embodiments of the invention may be greater than 6 microns, greater than 7 microns, or even greater than 8 microns. The grain size of alloys in accordance with embodiments of the invention may be less than 20 microns, less than 15 microns, less than 12 microns, less than 10 microns, or even less than 9 microns.

Metallic alloys in accordance with exemplary embodiments of the present invention may include, consist essentially of, or consist of niobium alloys containing 1-5 weight percent W, 0.5-5 weight percent Mo, and Ru and/or Pd individually or collectively present at 0.2-5 weight percent. In various embodiments, the W is present at 2-3 weight percent. In various embodiments, the Mo is present at 1-2 weight percent. In various embodiments, the Ru and/or Pd are individually or collectively present at 0.2-2 weight percent, 0.2-1 weight percent, or 0.2-0.5 weight percent. The alloy may contain Ru or Pd, but not both, but in some embodiments both Ru and Pd are present in the alloy.

EXAMPLES

A series of samples was fabricated for corrosion testing and evaluation of mechanical properties. Each sample was fabricated by VAR followed by mechanical rolling and subsequent annealing for recrystallization. Portions of each sample were subjected to two different corrosion tests each lasting 15 weeks. The first corrosion test involved submersion in 70% nitric acid ($HNO_3$) at 150° C., and the second corrosion test involved submersion in 80% sulfuric acid ($H_2SO_4$) at 140° C. The various samples evaluated are summarized in the table below, where all alloy concentrations are provided as weight percentages. As shown, three comparative samples (CS) were also prepared for comparison to the alloys in accordance with embodiments of the present invention. Comparative Sample 2, i.e., Zr 702, is nominally pure Zr that includes up to 4.5% Hf.

| Sample # | Composition |
| --- | --- |
| 1 | Nb-3% W-1.5% Mo |
| 2 | Nb-3% W-1.5% Mo-0.2% Ru |
| 3 | Nb-3% W-1.5% Mo-0.5% Ru |
| 4 | Nb-3% W-1.5% Mo-1% Ru |
| 5 | Nb-3% W-1.5% Mo-0.5% Pd |
| 6 | Nb-3% W-1.5% Mo-1% Pd |
| CS1 | Pure Nb |
| CS2 | Zr 702 |
| CS3 | Ta-3% W |

The results of the corrosion tests are summarized in the table below. The corrosion rates for each of the corrosion tests are provided in mils per year, and the concentration of hydrogen absorbed into each sample during each test is also reported A negative corrosion rate indicates that the weight of the sample increased during the test, perhaps due to reaction with the corrosive agent (e.g., formation of an oxide layer or other byproduct on the sample).

| | Corrosion Test #1 | | Corrosion Test #2 | |
| --- | --- | --- | --- | --- |
| Sample # | Corrosion Rate (mpy) | $H_2$ conc. (ppm) | Corrosion Rate (mpy) | $H_2$ conc. (ppm) |
| 1 | <0.01 | 2 | −31 | 285 |
| 2 | <0.01 | 2 | −34 | 143 |
| 3 | 0.03 | 2 | −24 | 118 |
| 4 | <0.01 | 4 | −21 | 41 |
| 5 | 0.01 | 5 | −24 | 8 |
| 6 | 0.01 | 3 | −24 | 29 |
| CS1 | 0.02 | 3 | Dissolved in less than 15 weeks | N/A |
| CS2 | −5.2 | 2 | Dissolved in less than 7 weeks | N/A |

As shown, all of the samples performed comparably to Comparative Sample 1 and Comparative Sample 2 during the first corrosion test. The comparative samples did not survive the second corrosion test and were clearly outperformed by the samples in accordance with embodiments of the present invention.

Various mechanical properties of the samples were also evaluated via tensile testing, and the results are summarized in the table below.

| Sample # | Anneal Temperature (° F.) | Grain Size (μm) | % Recrystallization | Yield Strength (ksi) | Ultimate Tensile Strength (ksi) | % Elongation |
|---|---|---|---|---|---|---|
| 1 | 1950 | 7.0 | 95 | 29.7 | 46.3 | 30.6 |
| 2 | 1950 | 8.6 | 98 | 42.8 | 52.3 | 27.0 |
| 3 | 2200 | 8.6 | 100 | 43.2 | 54.2 | 17.3 |
| 4 | 2200 | 8.4 | 100 | 43.1 | 55.8 | 18.9 |
| 5 | 2200 | 8.9 | 100 | 37.4 | 49.3 | 17.0 |
| 6 | 2200 | 8.6 | 100 | 40.6 | 54.1 | 25.4 |
| CS1 | 1800 | 6.0 | 100 | 19.2 | 31.8 | 31.3 |
| CS3 | 2550 | 6.9 | 100 | 38.6 | 53.8 | 35.5 |

As shown, the various samples in accordance with embodiments of the present invention displayed mechanical properties superior to those of pure Nb (Comparative Sample 1) and comparable to those of the Ta-based Comparative Sample 3 but are processable at lower (and thus more economical) annealing temperatures.

All the references described above are incorporated by reference in its entirety for all useful purposes. The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of chemical processing, the method comprising:
   providing equipment for chemical processing; and
   exposing the equipment to an acidic process fluid,
   wherein the equipment is composed of a metallic alloy consisting essentially of (i) 1 weight percent-10 weight percent tungsten, (ii) 0.5 weight percent-10 weight percent molybdenum, (iii) at least one of ruthenium or palladium collectively present at 0.2 weight percent-5 weight percent, and (iv) the balance niobium.

2. The method of claim 1, wherein a grain size of the metallic alloy is greater than 6 microns.

3. The method of claim 1, wherein the alloy comprises both ruthenium and palladium.

4. The method of claim 3, wherein a ratio of ruthenium content to palladium content in the alloy ranges from 1000:1 to 1:1000.

5. The method of claim 3, wherein a ratio of ruthenium content to palladium content in the alloy ranges from 500:1 to 1:500.

6. The method of claim 3, wherein a ratio of ruthenium content to palladium content in the alloy ranges from 100:1 to 1:100.

7. The method of claim 1, wherein the alloy contains 2 weight percent-10 weight percent tungsten.

8. The method of claim 1, wherein the alloy contains 2 weight percent-10 weight percent molybdenum.

9. The method of claim 1, wherein the alloy contains at least one of ruthenium or palladium collectively present at 2 weight percent-5 weight percent.

10. The method of claim 1, wherein the acidic process fluid comprises hydrochloric acid, nitric acid, phosphoric acid, sulfuric acid, and/or acetic acid.

11. The method of claim 1, wherein the equipment has the form of a plate, a sheet, or a tube.

12. The method of claim 1, wherein the equipment comprises a heat exchanger, a lined vessel, a static mixer, or a pump.

13. The method of claim 1, wherein a temperature of the acidic process fluid ranges from approximately 80° C. to approximately 250° C.

14. The method of claim 1, wherein (i) providing the equipment comprises alloying niobium with tungsten, molybdenum, and at least one of ruthenium or palladium, and (ii) the alloying is performed via laser additive manufacturing (LAM), vacuum arc remelting (VAR), electron beam melting (EBM), or plasma arc melting (PAM).

15. A method of chemical processing, the method comprising:
   providing equipment for chemical processing; and
   exposing the equipment to an acidic process fluid,
   wherein the equipment is composed of a metallic alloy consisting essentially of (i) 1 weight percent-5 weight percent tungsten, (ii) 0.5 weight percent-5 weight percent molybdenum, (iii) at least one of ruthenium or palladium collectively present at 0.2 weight percent-5 weight percent, and (iv) the balance niobium.

16. The method of claim 15, wherein the alloy comprises both ruthenium and palladium.

17. The method of claim 15, wherein the acidic process fluid comprises hydrochloric acid, nitric acid, phosphoric acid, sulfuric acid, and/or acetic acid.

18. The method of claim 15, wherein the equipment has the form of a plate, a sheet, or a tube.

19. The method of claim 15, wherein the equipment comprises a heat exchanger, a lined vessel, a static mixer, or a pump.

* * * * *